G. A. L. ARGLES.
RECORDING NEST FOR POULTRY.
APPLICATION FILED JAN. 21, 1909.

949,610.

Patented Feb. 15, 1910.
2 SHEETS—SHEET 1.

G. A. L. ARGLES.
RECORDING NEST FOR POULTRY.
APPLICATION FILED JAN. 21, 1909.
949,610.
Patented Feb. 15, 1910.
2 SHEETS—SHEET 2.
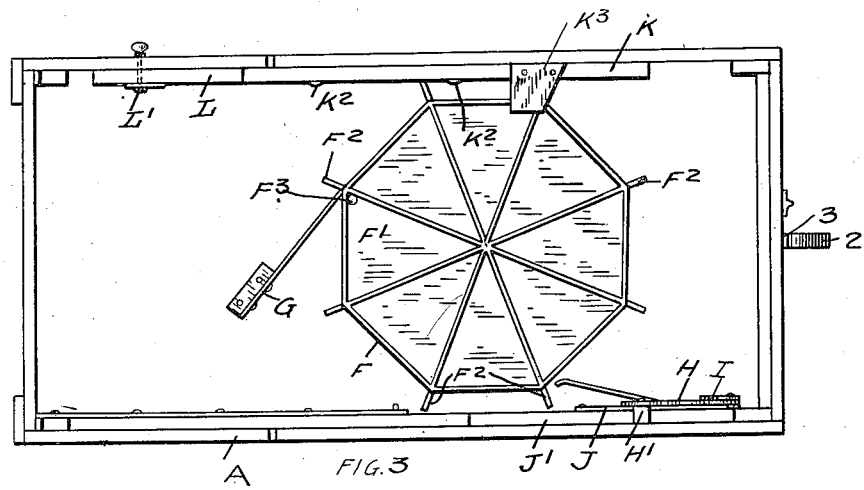
FIG. 3
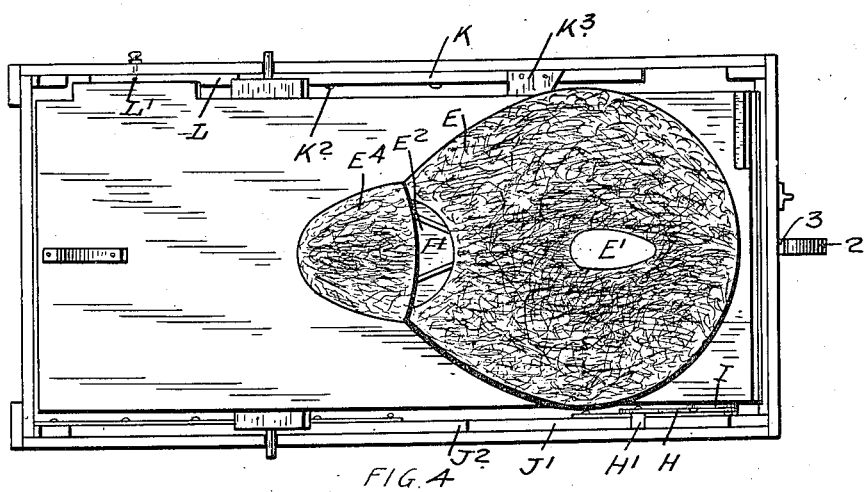
FIG. 4
FIG. 5
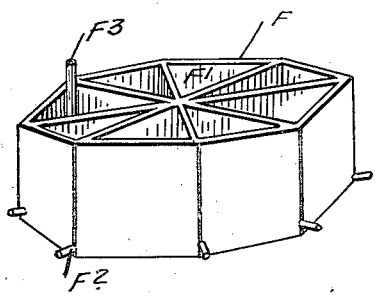
WITNESSES:
INVENTOR:
G. A. L. ARGLES,

# UNITED STATES PATENT OFFICE.

GUY A. L. ARGLES, OF NEWMARKET, ONTARIO, CANADA, ASSIGNOR OF TWO-THIRDS TO CHARLES GWYLLYM DUNN, OF TORONTO, CANADA.

RECORDING-NEST FOR POULTRY.

949,610.  Specification of Letters Patent.  Patented Feb. 15, 1910.

Application filed January 21, 1909. Serial No. 473,450.

*To all whom it may concern:*

Be it known that I, GUY ARTHUR LESLIE ARGLES, of the town of Newmarket, in the county of York, in the Province of Ontario, Canada, have invented certain new and useful Improvements in Recording-Nests for Poultry, of which the following is the specification.

My invention relates to improvements in recording nests for poultry, and the object of the invention is to devise a simple, cheap and effectual trap nest, which will inclose the hen and yet invite and allow immediate exit as soon as she has laid an egg, and at the same time record the egg, which she lays.

A further object is to devise a means of depositing the egg from the nest into a suitable receptacle immediately the hen has laid it, and thereby avoid the liability, as in ordinary trap nests, of the hen eating the egg.

A still further object is to provide for the storing of several eggs underneath the nest, where they are free from being tampered with by the hen.

Another object is to provide means for locking the nest, so as to prevent another hen entering when the storage receptacles are filled.

In general the object is to provide a nest of this class, which will obviate continuous attention by the poultry attendant and thereby save time and labor.

My invention consists of a casing divided preferably horizontally into a lower and upper portion, an entrance door or flap for the hen at the front, a tiltable false bottom, a nest located at the front thereof and having an opening leading therefrom below the bottom, a rotatable receptacle operated from the false bottom and having one of the pockets thereof located normally underneath the opening in the false bottom, hinged spring-held exit flaps having an opening therein, and a ring containing guide-way designed to normally hold one of the rings to register with the opening aforesaid, the parts being otherwise constructed and arranged in detail as hereinafter more particularly explained.

Figure 1:
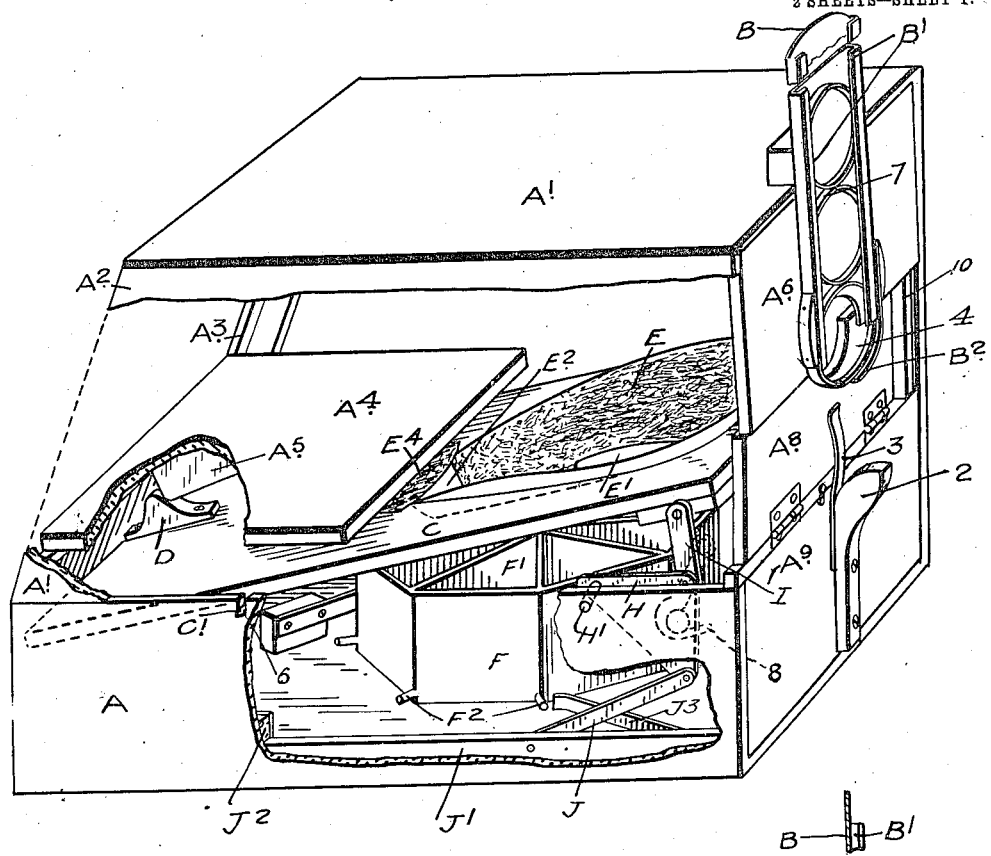
Figure 2:
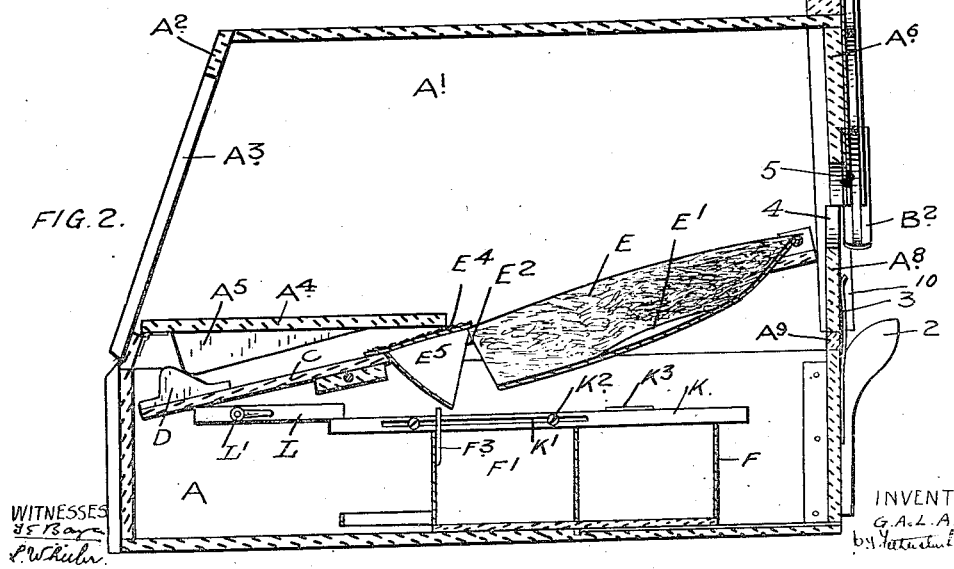

Figure 1, is a perspective view of my recording nest showing portion of the side broken away to exhibit the interior construction. Fig. 2, is a longitudinal section. Fig. 3, is a plan view of the lower portion of the casing showing the false bottom removed. Fig. 4, is a plan view of the lower portion of the casing showing the false bottom in position. Fig. 5, is a perspective detail of the rotatable receptacle.

In the drawings like letters of reference indicate corresponding parts in each figure.

$A$ is the bottom portion of the casing, which is preferably rectangular in form and $A'$ is the top portion, which has one end $A^2$ inclined as indicated and provided with a frame $A^3$.

$A^4$ is an entrance door or flap, which is hinged on the bottom edge of the frame $A^3$ and is provided with an inner tri-angular central rib $A^5$.

$A^6$ is a downwardly extending front flap, which is provided with a spring hinge $A^7$ at the top, which normally tends to hold it closed.

$A^8$ is an upwardly extending front flap, which meets the edge of the downwardly extending flap $A^6$, being hinged to the lower portion of the top $A'$.

2 is a bracket secured to the end $A^9$ of the bottom portion $A$ of the casing and designed to form a support for the flap $A^8$ when it is thrown downwardly as hereinafter described.

3 is a spring, which is fastened to the end $A^9$ inside of the bracket 2 and is designed to normally hold the flap $A^8$ in a substantially vertical position. The flap $A^8$ is provided with an arc-shaped recess 4 and the flap $A^6$ with an arc-shaped recess 5, which together practically make a circular-shaped hole.

$B$ is a chute secured to the flap $A^6$ and provided with side guide-ways $B'$. The lower end of the chute $B$ is provided with curved fingers $B^2$ suitably held on the outside of the guide-ways as indicated. The spring fingers are very light and serve to form a stop for the recording rings 7, which are numbered. The recording rings are located one above the other in the chute $B$.

$C$ is the tiltable false bottom, which is pivoted on the pins $C'$ in the notches 6 in the sides of the lower portion $A$.

$D$ is a block secured to the entrance end of the false bottom.

$E$ is the nest formed in concavo-convex form at one end of the false bottom $C$ and provided with an egg-like protuberance $E'$ in the center.

E² is an opening formed at one end of the nest and at the end near the flap A⁴. The ordinary incline of the nest is from the end A⁹ downwardly toward the opposite end beneath the entrance flap A⁴.

E⁴ is a shield extending over the major portion of the opening E² and designed to prevent the hen putting its bill down below the false bottom.

E⁵ is an apron forming a supplemental guard to break the fall of the egg, so that it is deposited lightly in one of the pockets F′ of the receptacle F. The receptacle F is octagonal in form and provided with several triangularly shaped pockets F′ and laterally projecting pins F² outside of the pockets, and an upwardly extending pin F³.

G is a finger pawl, which is designed to engage and hold fast the receptacle by abutting one of the pins F².

The receptacle F is pivoted in the center and is rotated as follows.

H is a bell crank pivoted on a pin H′.

I is a link connecting the forward end of the tiltable false bottom C to one corner of the bell crank H.

J is a link connecting the lower corner of the bell crank H to the longitudinal bar J′ held in suitable guide-ways J² on the inside of the lower portion of the lower casing A.

J³ is a finger pawl, which is fastened to the bar J and is designed to contact with the pins F².

K is a bar provided with a longitudinal slot K′ and pins K² extending therethrough.

K³ is a plate secured to the bar K.

L is a bar pivoted on the pin L′ and resting normally on the end of the bar K. The bar L at the end where it rests on the bar K will drop, so as to throw the short end of the bar up as will hereinafter appear.

Having now described the principal parts involved in my invention I shall briefly describe its operation and utility. The flap or door A⁴ is normally left open. The hen walks in over the flap A⁴ and passes on to the nest E, thereby tilting the false bottom C, throwing the block D against the rib A⁵ and thus closing the flap A⁴ and locking the hen in the receptacle on her nest. She is now in a position to lay an egg and will do so. As soon as she has laid an egg the hen wants to get out and seeing a circular opening formed by the arc-shaped recesses 4 and 5 she thrusts her neck into the opening thus formed, thereby receiving a ring 7 on her neck. Still pressing forwardly to escape from the nest she forces open the flaps A⁶ and A⁸ against the tension of the spring hinge A⁷ and spring 3, and passes out. Upon the hen passing on to the nest she presses down the front end of the tiltable false bottom C and by means of the link I crank H and link J she forces the receptacle around one space, so as to bring an empty compartment underneath the opening E³. When she lays an egg it drops into the empty receptacle. When the eighth hen passes upon the nest she depresses the forward end of the tiltable false bottom C and rotates the compartment F bringing the pin F³ against the plate K³ of the bar L, thus forcing the bar forward and withdrawing the support for the front end of the bar L, which now being free at the short end as well as the long end on account of the rear end of the tiltable bottom having passed upwardly and the flap A⁴ closed, such bar L drops to the perpendicular and locks the tiltable bottom up at the shorter end and the flap A⁴ closed against any further incoming hen. When the eighth hen has laid an egg it will be seen that the recording nest is locked. As the rings 7 are all numbered the attendant of the poultry will be readily enabled to determine which hens are good layers. It will be seen from this description that the eggs, which are laid, are carefully preserved from being destroyed by the hens.

It will be noticed that the top portion A′ is hooked to the bottom portion A² by hooks 8. By unhooking the hooks 8 the top portion may be removed and the receptacle taken out and the eggs removed when it may be restored and the parts restored to the normal position ready for use again.

In order to further insure that the tiltable false bottom is locked as soon as the hen gets in I provide a depending bar 10, which is secured to the flap A⁶ and this bar 10 swings over the front edge of the tiltable false bottom when the same is depressed by the hen and thereby locks the nest in position so that if the hen should pass backwardly, the false bottom cannot resume its original position as it would do if it were not locked. The bottom of the bar 10 projects but slightly over the edge of the tiltable bottom just sufficiently to lock it.

What I claim as my invention is:

1. In a recording nest for poultry, the combination with the casing, of a tiltable bottom fulcrumed in the casing and extending from end to end and provided with a nest at one end, the nest having an opening at one end thereof, a receptacle located underneath the tiltable bottom and provided with a plurality of compartments, one of which is designed to be located underneath the opening of the nest, and means connected to the tiltable bottom for rotating the receptacle upon the depression of the nest end of the tiltable bottom as and for the purpose specified.

2. In a recording nest for poultry, the combination with the casing, of a tiltable bottom fulcrumed in the casing and extending from end to end and provided with a nest at one end, the nest having an opening at one end thereof, a receptacle underneath the tiltable bottom and provided with a plurality of compartments, one of which is designed to be located underneath the opening of the nest, pins extending from the periphery of the egg receptacle, a bar held in suitable guide-ways, a bell-crank pivoted in the casing, a link connecting one end of the bell crank to the tiltable bottom, a link connecting the opposite end to the bar, and a finger pawl connected to the bar and designed to engage with the pins of the egg receptacle as and for the purpose specified.

3. In a recording nest for poultry, the combination with a casing and a tiltable false bottom containing the nest and suitably fulcrumed and provided with an opening at one end of the nest, of a rotatable receptacle located underneath the false bottom, means for rotating such receptacle operated from the depression of one end of the tiltable bottom, a pin extending upwardly from the receptacle, a bar having a plate with which such pin is designed to come in contact, an entrance door and means connected to the false bottom for normally closing the entrance door when the nest is tilted, a bar suitably fulcrumed and resting normally on the end of the bar containing the plate and designed when the bar aforesaid is drawn forward to swing to the perpendicular and lock the tilting bottom and entrance door as and for the purpose specified.

4. The combination with a casing and a tiltable false bottom containing the nest, of the upper and lower exit doors or flaps, the former being hinged at the top and the latter at the bottom, the abutting edges containing arc-shaped recesses forming a substantially circular opening, a guide-way secured to the upper flap and provided with spring fingers extending down beneath the circular opening formed by the two recesses in the abutting edge of the door and rings in said guide-way and supported by said spring fingers as and for the purpose specified.

5. The combination with the lower portion of the casing and tiltable false bottom and nest suitably fulcrumed, of the upper portion having the flap provided with a downwardly extending bar designed to pass on to the exit edge of the tiltable false bottom upon its being depressed by the hen as and for the purpose specified.

6. A nest comprising a casing, a tiltable false bottom therein, an entrance door to the casing, opening inwardly and resting on the false bottom when open so as to serve as a platform, a bracket on the door and a bracket on the false bottom adapted to engage with the bracket on the door for closing the same when the bottom is tilted.

7. A nest comprising a casing, a tiltable false bottom in said casing, a nest at one end of said bottom, said nest having an opening at one end leading to the space below the false bottom, a shield extending over the top of said opening, and an apron underneath the shield adapted to receive the egg from the nest when the bottom is tilted.

GUY A. L. ARGLES.

Witnesses:
B. BOYD,
R. COBAIN.